(12) United States Patent
Gandhi et al.

(10) Patent No.: US 7,610,281 B2
(45) Date of Patent: Oct. 27, 2009

(54) EFFICIENT COMPUTATION OF DOCUMENT SIMILARITY

(75) Inventors: Rikin Gandhi, Las Vegas, NV (US); Yasuhiro Matsuda, Palo Alto, CA (US); Mohammad Faisal, Belmont, CA (US)

(73) Assignee: Oracle International Corp., Redwood Shores, CA (US)

( * ) Notice: Subject to any disclaimer, the term of this patent is extended or adjusted under 35 U.S.C. 154(b) by 231 days.

(21) Appl. No.: 11/606,213

(22) Filed: Nov. 29, 2006

(65) Prior Publication Data

US 2008/0126335 A1   May 29, 2008

(51) Int. Cl.
*G06F 17/30* (2006.01)
(52) U.S. Cl. ............................. 707/5; 707/102
(58) Field of Classification Search ................ 707/1–6, 707/102, 104.1; 715/256, 257
See application file for complete search history.

(56) References Cited

U.S. PATENT DOCUMENTS 7,321,259 B1 * 1/2008 Shumarayev ................. 330/9
2007/0150279 A1 * 6/2007 Gandhi et al. ............... 704/258
2008/0010316 A1 * 1/2008 Liao et al. ................. 707/104.1
2008/0077570 A1 * 3/2008 Tang et al. ..................... 707/5

* cited by examiner

*Primary Examiner*—Diane Mizrahi
(74) *Attorney, Agent, or Firm*—Kraguljac & Kalnay, LLC

(57) ABSTRACT

Systems, methodologies, media, and other embodiments associated with efficiently computing document similarity are described. One exemplary system embodiment includes logic to produce a gram from a string and logic to identify candidate documents based on identifying matches between query grams and document grams stored in an inverted index that relates grams to documents. The example system may also include logic to selectively partially reconstruct a candidate document from entries in the inverted index and logic to compute an edit distance between a string associated with a query and a string associated with the partially reconstructed candidate document. The example system may also include a signal logic configured to provide a signal corresponding to the edit distance.

17 Claims, 6 Drawing Sheets

EFFICIENT COMPUTATION OF DOCUMENT SIMILARITY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to the following U.S. patent applications, which are assigned to the present assignee:

"TERM MATCHING WITH CONTEXT SENSITIVE CHARACTER TO SOUND CORRELATION", Ser. No. 11/318,826, filed Dec. 27, 2005, inventors: Gandhi and Liao, and "SPELLING CORRECTION WITH GRAMS AND INVERTED INDEX", Ser. No. 11/481,750 filed Jul. 6, 2006, inventors: Liao and Alpha, .

BACKGROUND

Conventionally, a system to compute document similarity to a query will receive a query, identify candidate documents, retrieve candidate documents from storage (e.g., disk), and compute a similarity score for all the candidate documents. This is inefficient due to computing similarities for too many documents and/or due to the time associated with retrieving too many documents from a relatively slow storage medium. Another conventional technique involves receiving a query, making grams for query terms, and simply counting the number of grams in the query that match grams in a data store. While more efficient than the first system, the gram-counting approach provided low precision and thus may have missed identifying documents having a high relevance to the query and may have provided documents having a low relevance to the query.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
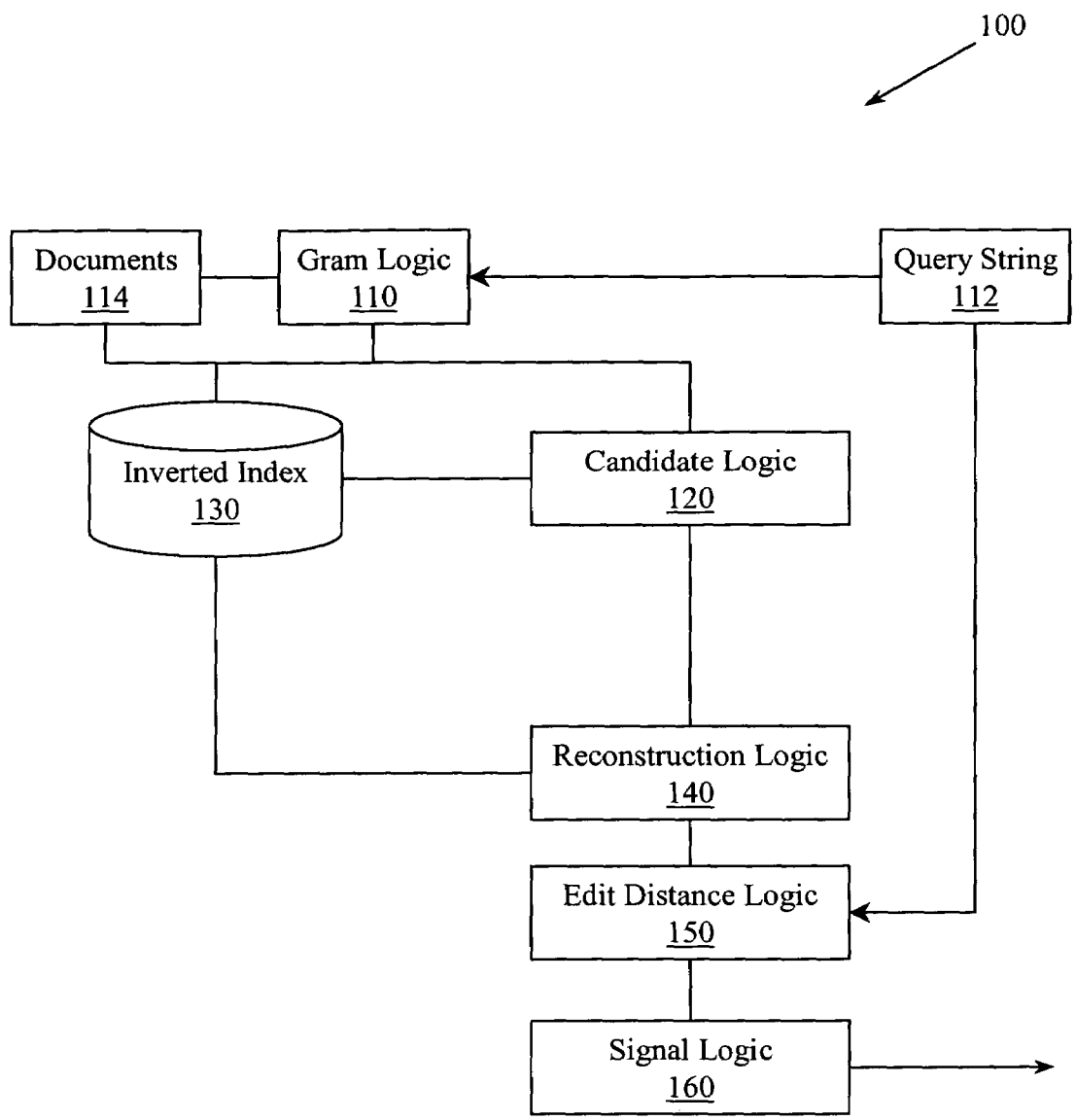
FIG. 1 illustrates an example system for efficient computation of document similarity.

A document has a set of terms. A document term may have a set of grams. Data concerning a gram may include the offset of the gram in a term, in a document, and so on. An inverted index may use grams as a key field. The inverted index may store information including grams, document identifiers, offsets, and so on. This information may be used to partially reconstruct a document without actually retrieving the entire document from a relatively slower data store (e.g., disk). When partially reconstructed, the document may include known substrings and unknown substrings.

A query has a set of terms. A query term may have a set of grams. Candidate documents that may be relevant to a query may be identified by searching an inverted index using query term grams. Selected (e.g., less than all) candidate documents can then be partially reconstructed using the matching grams and offset information available in the inverted index. Documents may be selected for partial reconstruction based on an initial similarity measure (e.g., number of matched grams, percentage of grams matched, number of matched grams divided by number of grams in a document, rank).

An edit distance (e.g., Levenshtein, Hamming) may then be computed between the query and a portion(s) of the partially reconstructed document. The edit distance may be normalized (e.g., edit distance compared to string length). The edit distance may be computed between a first string prepared from the query terms and a second string prepared from the partially reconstructed document. Preparing the strings may include, for example, aligning grams, shifting characters, and so on.

In some examples, additional grams (e.g., skipping grams, mismatch grams) may be created, indexed, and used in determining document similarity. These additional grams may lead to additional processing when selecting candidate documents to reconstruct and may lead to additional processing when constructing strings for which an edit distance will be computed. For example, multiple query grams from a single query term may match multiple index grams from a single indexed document term. Therefore, duplicate removal may be performed to select which query term is most similar to an indexed document term before edit distance is computed. Term similarity may be established using a count of matched grams between query terms and index terms. By way of illustration, a two dimensional array can be built that relates matches between query term grams and index term grams.

| Matches Between Query Term and Index Term | | | | |
|---|---|---|---|---|
| | Index Term 1 | Index Term 2 | ... | Index Term N |
| Query Term 1 | A1 | A2 | ... | An |
| Query Term 2 | B1 | B2 | ... | Bn |
| ... | ... | ... | ... | ... |
| Query Term N | X1 | X2 | ... | Xn |

Where $a_i$ represents the number of matches between index term i ($IT_i$) and query term i ($QT_i$). The two dimensional array may then be flattened by selecting the largest value for $a_i$, and $b_i$ through $x_i$, and constructing a one dimensional array from these values. This flattened array may then be used in preparing strings for edit distance processing.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that stores instructions and/or data. A computer-readable medium may take forms, including, but not limited to, non-volatile media and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Edit Distance" is a term of art in computer science string processing. Levenshtein edit distance and Hamming distance are two example edit distances. A Levenshtein edit distance measures the minimum number of operations required to correct one string to another string, where operations include insertions, deletions, and substitutions. A Hamming edit distance measures the minimum number of operations required to convert one string to another string where the operations do not include insertions or deletions and thus include only substitutions. Other edit distances may also measure the minimum number of operations required to convert one string to another string and may include insertions, deletions, shifts, rotations, substitutions, compressions, expansions, and so on.

An "inverted index" is a data structure known to those skilled in the art of computer science. In one example it may use a gram as a key field upon which the data structure can be searched. Information stored in an inverted index may include a document identifier that identifies a document in which a gram appears. An example inverted index is illustrated below.

$gram_1$ (docid, a, b, c, d), (docid, a, b, c, d), . . .
$gram_2$ (docid, a, b, c, d), (docid, a, b, c, d), . . .
$gram_3$ (docid, a, b, c, d), (docid, a, b, c, d), . . .

Where docid=identifier of document in which gram appears
   A=offset of gram in document
   B=offset of term in document
   C=offset of gram in term
   D=type of gram (e.g., normal, skipping, misspelled, . . . )

While entries with five data points are provided, it is to be appreciated that a greater and/or lesser number of data points may be included.

"Logic", as used herein, includes hardware, firmware, software embodied as computer-executable instructions stored on a computer-readable medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, and so on. Logic may include one or more gates, combinations of gates, or other circuit components. Logic may also be fully embodied as software embodied as computer-executable instructions stored on a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, on the environment in which it runs, on the desires of a designer/programmer, and so on. It will also be appreciated that in some examples computer-readable and/or executable instructions may be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, is embodied as an article of manufacture and maintained or provided as part of a computer-readable medium as defined previously.

"User", as used herein, includes but is not limited to one or more persons, software, computers or other devices, or combinations of these.

The following example will be referred to in discussing some of the example systems and methods.

Consider these four short documents:
$Doc_1$ John Smith lives in Dallas
$Doc_2$ John Dallas lives in Smith
$Doc_3$ Long John Silver
$Doc_4$ Silverton Colorado The following sets of grams could be constructed for these documents:

| $Doc_1$ | |
|---|---|
| n = 3 | n = 4 |
| joh | john |
| ohn | smit |
| smi | mith |
| mit | live |
| ith | ives |
| liv | dall |
| ive | alla |
| ves | llas |
| dal | |
| all | |
| lla | |
| las | |

| $Doc_2$ | |
|---|---|
| n = 3 | n = 4 |
| joh | john |
| ohn | dall |
| dal | alla |
| all | llas |
| lla | live |
| las | ives |
| liv | smit |
| ive | mith |
| ves | |
| smi | |
| mit | |
| ith | |

| $Doc_3$ | |
|---|---|
| n = 3 | n = 4 |
| lon | long |
| ong | john |
| joh | silv |
| ohn | ilve |

| $Doc_3$ | |
|---|---|
| n = 3 | n = 4 |
| sil | lver |
| ilv | |
| lve | |
| ver | |

| $Doc_4$ | |
|---|---|
| n = 3 | n = 4 |
| sil | silv |
| ilv | ilve |
| lve | lver |
| ver | vert |
| ert | erto |
| rto | rton |
| ton | colo |
| col | olor |
| olo | lora |
| lor | orad |
| ora | rado |
| rad | |
| ado | |

Using these grams, an inverted index may be created. In this example, grams having n=4 will be used to create the inverted index. Entries in the inverted index will include a document identifier, an offset into the document at which the gram appears, and an offset into the term from which the gram was generated.

Inverted Index

| | Key Field | | |
|---|---|---|---|
| gram | $entry_1$ | $entry_2$ | $entry_3$ |
| john | 1, 1, 1 | 2, 1, 1 | 3, 6, 1 |
| smit | 1, 6, 1 | 2, 22, 1 | |
| mith | 1, 7, 2 | 2, 23, 2 | |
| live | 1, 12, 1 | 2, 13, 1 | |
| ives | 1, 13, 2 | 2, 14, 2 | |
| dall | 1, 21, 1 | 2, 6, 1 | |
| alla | 1, 22, 2 | 2, 7, 2 | |
| llas | 1, 23, 3 | 2, 8, 3 | |
| long | 3, 1, 1 | | |
| silv | 3, 11, 1 | 4, 1, 1 | |
| ilve | 3, 12, 2 | 4, 2, 2 | |
| lver | 3, 13, 3 | 4, 3, 3 | |
| vert | 4, 4, 4 | | |
| erto | 4, 5, 5 | | |
| rton | 4, 6, 6 | | |
| colo | 4, 11, 1 | | |
| olor | 4, 12, 1 | | |
| lora | 4, 13, 3 | | |
| orad | 4, 14, 4 | | |
| rado | 4, 15, 5 | | |

As will be described below in different examples, the offset information available in an inverted index entry can be used to partially reconstruct indexed documents based solely on matching grams. So, once it is determined that there are matching grams between a query and a document, returned offset information can be used to determine how characters within matching grams occur within a source document. A document can be built with known and unknown portions.

In the example, consider receiving a query "john smith". Grams may then be computed for the query.

| n = 3 | n = 4 |
|-------|-------|
| joh   | john  |
| ohn   | smit  |
| smi   | mith  |
| mit   |       |
| ith   |       |

Candidate documents may then be identified by searching the inverted index using query grams. In this example, grams having n=4 will be used to search the inverted index illustrated above. Using grams with n=4, the following matches are identified:

| john | 1, 1, 1 |
|      | 2, 1, 1 |
|      | 3, 6, 1 |
| smit | 1, 6, 1 |
|      | 2, 22, 1 |
| mith | 1, 7, 2 |
|      | 2, 23, 2 |

From these matches, candidate documents may be selected for partial reconstruction. Rather than reconstruct all documents for which a matching gram was found, less than all the documents may be reconstructed based on initial similarity measures. These initial similarity measures may include, for example, total number of matches, total number of matches compared to total number of terms (in query, in document), total characters matched, total characters matched compared to total number of characters (in query, in document).

Examining the example shows that $doc_1$ has three matches, $doc_2$ has three matches, $doc_3$ has one match and $doc_4$ has no matches. Further examining the example shows that doc, has three matches out of three grams in the query, $doc_2$ has three matches out of three grams in the query, $doc_3$ has one match out of three grams in the query, and $doc_4$ has no matches. Further examining the example shows that $doc_1$ has three matches out of eight grams in the document, $doc_2$ has three matches out of eight grams in the document, $doc_3$ has one match out of five grams in the document, and $doc_4$ has no matches out of eleven grams in the document. To continue the example, documents one and two may be selected for partial reconstruction.

As described above, returned offset information can be used to determine how characters within matching grams occur within a source document. Thus, the character "s" may be placed at index 6 in $doc_1$ because of matching gram 'smit', 1,6,1, and may also be placed at index 22 in $doc_2$ because of matching gram 'smit',2,22,1. Partially reconstructing the documents yields:

The question marks represent unknown portions of the partially reconstructed document. Different strings may be prepared from the partial reconstruction of either doc1 or doc2 to compare to the query. For example, terms may be aligned, intervening characters may be eliminated, substitutions may occur, and so on.

An edit distance may then be computed between a string and the query. For example, a first edit distance that allows changes, but no deletions or rotations would yield an edit distance of 1 for $doc_1$ and the query and an edit distance of 23 for $doc_2$ and the query. A second edit distance that allows changes and alignment would yield an edit distance of 1 plus no alignments for $doc_1$ and the query and an edit distance of 1 plus 16 alignments for $doc_2$. While two different edit distances are described, it is to be appreciated that other edit distances may be employed.

The matching and edit distances may be affected by different types of grams. Consider a gram abcd. Different types of grams may be created from this original gram. For example, "skipping" grams that allow one or more characters to be skipped and yet still yield a match may be produced. Skipping grams for abcd may include a*bcd, ab*cd, and abc*d. To understand a skipping gram, consider that the term axyzbcd would match the skipping gram a*bcd. Grams may also include, in some examples, delimiter characters that mark the start and/or end of a term. Grams may also include, in some examples, "mismatch" characters, which may also be referred to as wildcard characters. Mismatch grams for abcd may include ^bcd, a^cd, ab^d, and abc^. To further understand a mismatch gram, consider that the term ancd would match the gram a^cd.

FIG. 1 illustrates a system 100. The system 100 may include a gram logic 110 to produce a gram from a string. The string may be, for example, a query string 112, a string from a document, and so on. A gram may have n characters, in one example n being an integer greater than two. While a gram may have a single character, a single character may in some examples be referred to as a character rather than a gram. In different examples a gram may include characters other than term characters. For example, a gram may include a skipping character, a mismatch character, a delimiter character, and so on.

System 100 may also include a candidate logic 120 to identify candidate documents. The candidate documents may be selected from a set of documents 114. Information concerning the documents 114 may be stored in an inverted index 130. The identifying performed by the candidate logic 120 may be based on identifying a match between a query gram produced by the gram logic 110 (e.g., from query string 112) and a document gram associated with a document. As mentioned above, document grams may be stored in inverted index 130 that relates grams to documents. An entry in the inverted index 130 may include, for example, a document identifier, a gram offset, a term offset, a gram type, and so on.

System 100 may also include a reconstruction logic 140 to selectively partially reconstruct a candidate document from entries in the inverted index 130. The entries from which the candidate document is reconstructed are entries associated

|       | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|-------|---|---|---|---|---|---|---|---|---|----|----|----|----|----|----|----|----|----|----|----|----|----|----|----|----|----|
| doc1  | j | o | h | n | ? | s | m | i | t | h  | ?  | ?  | ?  | ?  | ?  | ?  | ?  | ?  | ?  | ?  | ?  | ?  | ?  | ?  | ?  | ?  |
| doc2  | j | o | h | n | ? | ? | ? | ? | ? | ?  | ?  | ?  | ?  | ?  | ?  | ?  | ?  | ?  | ?  | ?  | ?  | s  | m  | i  | t  | h  |
| query | j | o | h | n |   | s | m | i | t | h  |    |    |    |    |    |    |    |    |    |    |    |    |    |    |    |    | with both the candidate document and query grams that match document grams in the candidate document. In one example, the reconstruction logic 140 produces the second string. An example second string may have a known portion (e.g., known substring) and an unknown portion (e.g., unknown substring). The location and content of the known portion may be determined by information stored in entries in the inverted index 130. For example, the content and offset information may facilitate partially recreating a document. For example, as described above, the character "s" may be placed at index 22 in $doc_2$ because of matching gram 'smit', 2,22,1. Once again the entries used to reconstruct the document correspond to matches between document grams associated with the candidate document and query grams associated with the query string. In different examples, the reconstruction logic 140 selects a candidate document to partially reconstruct based on different criteria. The criteria may be based, for example, on the number of matches between query grams associated with the query string and document grams associated with the candidate document, on a percentage of matches between query grams and document grams, on a normalized similarity score that relates a number of matches between query grams and document grams to a total number of query grams, a total number of document grams, and so on.

System 100 may also include an edit distance logic 150 to compute an edit distance between a first string associated with the query string 112 and a second string associated with the partially reconstructed candidate document. The edit distance may be, for example, a Levenshtein distance, a Hamming distance, a proximity score, a normalized edit distance score, and so on.

System 100 may also include a signal logic 160 to provide a signal corresponding to the edit distance. The signal may be, for example, a value corresponding to the edit distance.

Figure 2:
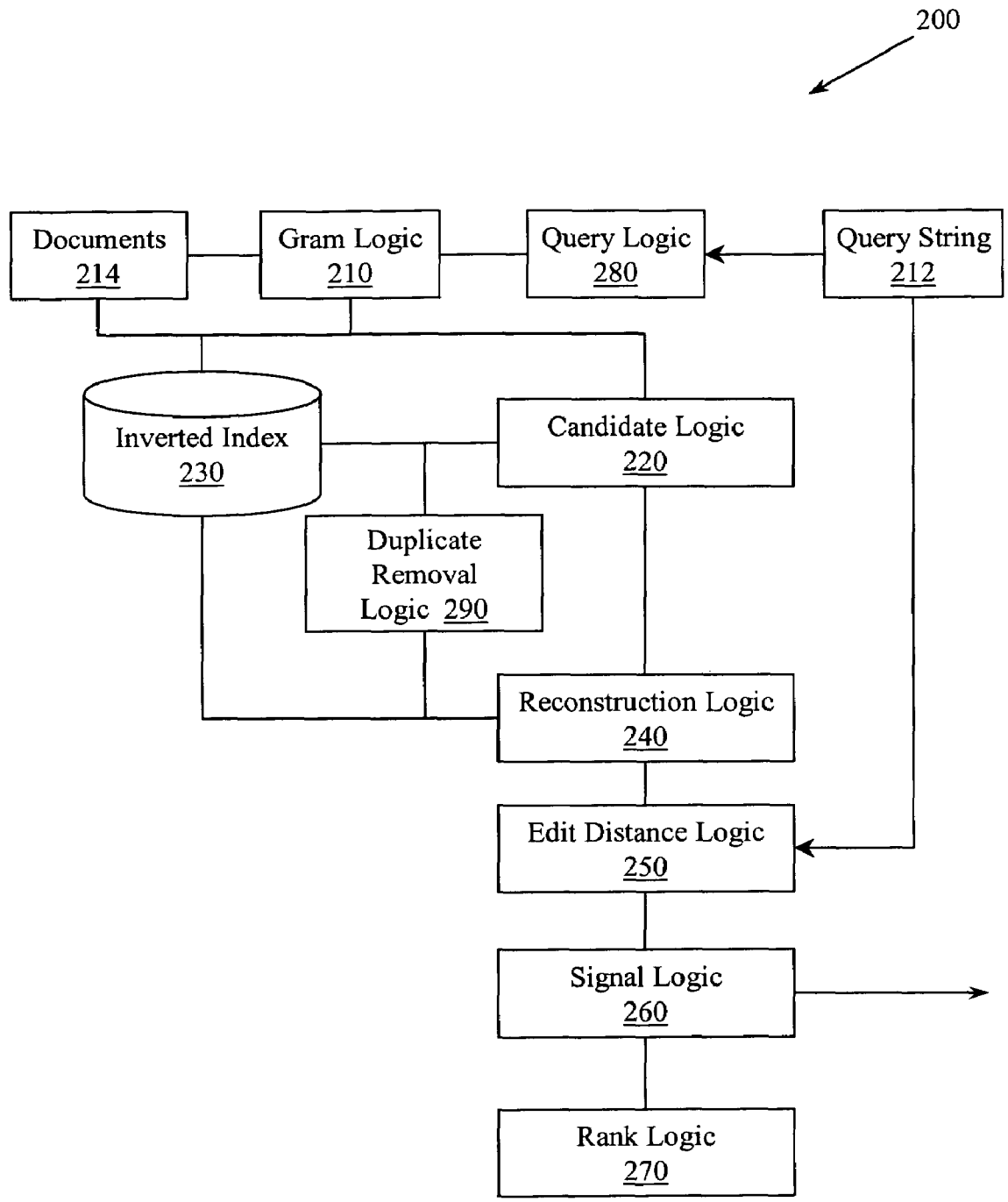
FIG. 2 illustrates an example system for efficient computation of document similarity.

FIG. 2 illustrates a system 200 that has some elements similar to those described in connection with system 100 (FIG. 1). For example, system 200 includes a gram logic 210, candidate logic 220, reconstruction logic 240, edit distance logic 250, and signal logic 260. System 200 also interacts with some entities similar to those described in connection with system 100 (FIG. 1). For example, system 200 interacts with a query string 212, documents 214, and an inverted index 230. However, system 200 includes additional logics.

For example, system 200 includes a query logic 280 to receive and store the query string 212. The query logic 280 may therefore include a memory. System 200 also includes a rank logic 270 to receive signals from the signal logic 260 and to provide an output that describes an ordered set of documents relevant to the query string 212. The rank logic 270 may produce, for example, an ordered list that may be displayed. The ordered list may include, for example, hyperlinks to stored documents. System 200 may also include a duplicate removal logic 290 to perform additional processing that may be required when grams having skipping characters, mismatch characters, delimiting characters, and so on, are employed. The duplicate removal logic 290 may select one of a plurality of redundant matching grams to include in a string to provide to the edit distance logic 250. The selected gram may be the gram having the most natural correspondence to the matched term.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device.

Figure 3:
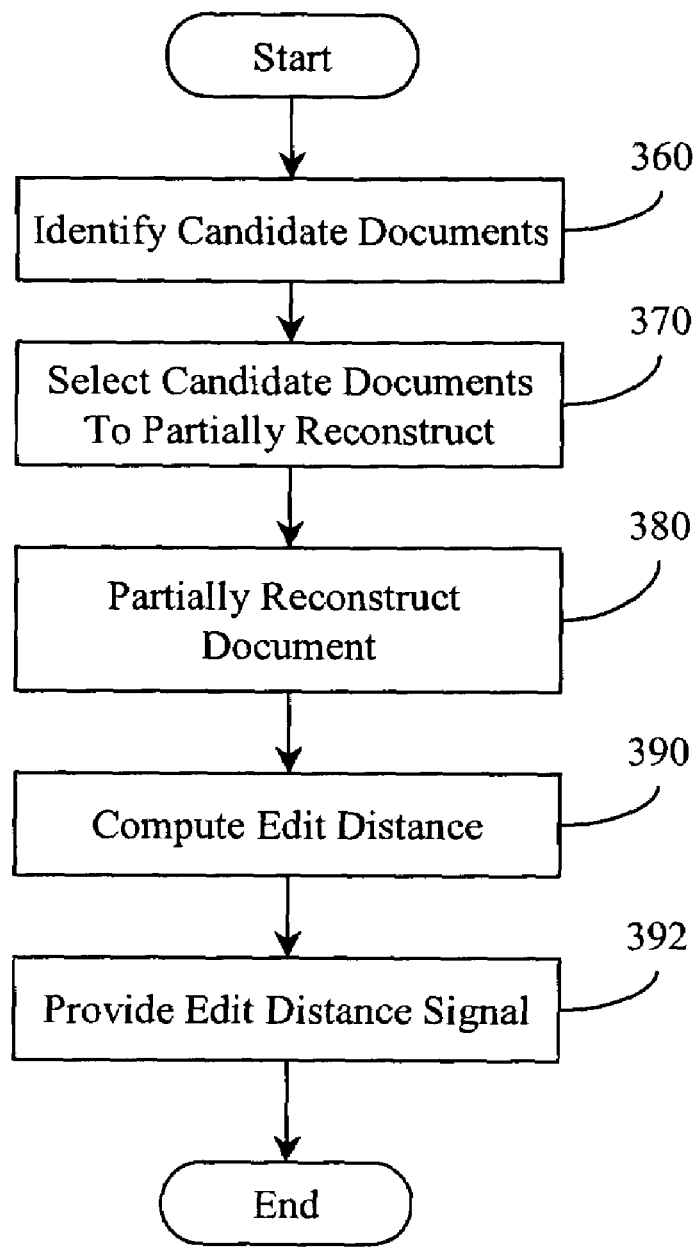
FIG. 3 illustrates an example method for efficient computation of document similarity.

FIG. 3 illustrates a method 300. Method 300 includes, at 360, identifying a set of candidate documents from a set of indexed documents. The identifying may be achieved in response to comparing a first set of grams to a second set of grams. The first set of grams are related to a query for documents and the second set of grams are related to indexed documents. Thus, the identifying may include finding grams in an inverted index that match grams for a query and then retrieving a document identifier from the inverted index.

Method 300 may also include, at 370, selecting a subset of the set of candidate documents to partially reconstruct based on a similarity score. In one example, the similarity score is computed from a number of matches between the first set of grams and the second set of grams, a percentage of matches between the first set of grams and the second set of grams, and/or a normalized score based on a number of matches between the first set of grams and the second set of grams. In one example, selecting 370 the candidate documents includes searching an inverted index organized with a gram-based key field. The inverted index relates grams to documents from which the grams were computed. Entries in the inverted index may include a document identifier, a gram offset, a term offset, a gram type, and so on. The searching may be performed on the gram-based key field using a query gram from the first set of grams.

Method 300 may also include, at 380, selectively partially reconstructing a member of the subset of candidate documents. The partial reconstruction may rely on members of the second set of grams and offset information associated with the members of the second set of grams. For example, as described above, the character "s" may be placed at index 22 in $doc_2$ because of matching gram 'smit',2,22,1. Partial reconstruction may include, for example, building a string that includes the characters found in the matching grams and positioning those characters based on the offset information stored in the inverted index. Building the string may also include providing "filler" or other identifiers for unknown locations in the string. In different examples, a gram may include a skipping character, a substitution character, and/or a delimiter character. Thus, method 300 may include (not illustrated) selecting one of a plurality of overlapping matching grams for grams appearing in both the first set of grams and the second set of grams. The selected gram may then be used to partially reconstruct the document by, for example, building the string with known and unknown portions.

Method 300 may also include, at 390, computing an edit distance between a first string related to the first set of grams and a second string related to the partially reconstructed document. Before the edit distance is computed, the first string or the second string may be manipulated. The manipulating may include, for example, aligning the first string and the second string, padding a string, eliminating a character from a string, and replacing a character in a string. The edit distance may be, for example, different edit distances as described herein.

Method 300 may also include, at 392, providing a signal corresponding to the edit distance. The signal may be, for example, a data value corresponding to an edit score, a data value corresponding to a relative edit score, a data value corresponding to a normalized edit score, and so on.

While FIG. 3 illustrates various actions occurring in serial, it is to be appreciated that various actions illustrated in FIG. 3 could occur substantially in parallel. By way of illustration, a first process could identify candidate documents. Similarly, a second process could select candidate documents for a partial reconstruction and partially reconstruct the selected candidate documents while a third process could compute an edit distance and provide a signal concerning the edit distance. While three processes are described, it is to be appreciated that a greater and/or lesser number of processes could be employed and that lightweight processes, regular processes, threads, and other approaches could be employed.

Figure 4:
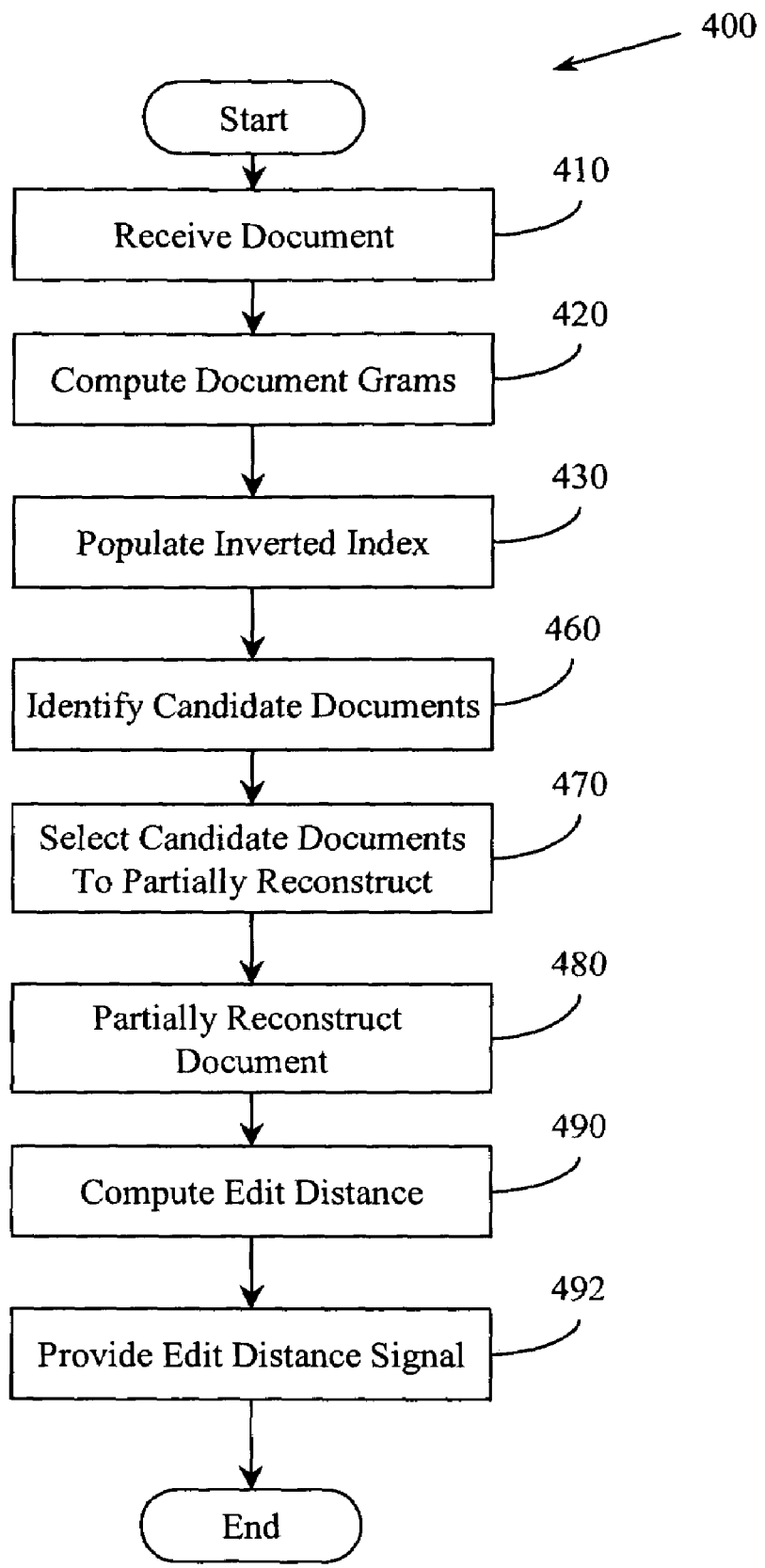
FIG. 4 illustrates an example method for efficient computation of document similarity.

FIG. 4 illustrates a method 400. Method 400 includes some actions similar to those described in connection with method 300 (FIG. 3). For example, method 400 includes identifying candidate documents 460, selecting candidate documents 470, partially reconstructing candidate documents 480, computing an edit distance 490, and providing an edit distance signal 492. However, method 400 may include additional actions.

For example, method 400 may include, at 410, receiving a document to be indexed. The document may be received, for example, across a network, from a storage medium, and so on. After receiving the document, method 400 may proceed, at 420, to compute a set of grams for the document. In different examples the grams may take the various forms described herein. Having computed the grams, method 400 may then proceed, at 430, to populate an inverted index with a document identifier corresponding to the document and with data corresponding to the grams. The data corresponding to the members of the set of grams may include, for example, offsets, gram types, and so on. The data corresponding to the members of the set of grams may subsequently be used to reconstruct documents without having to retrieve the document from which the grams were generated.

Figure 5:
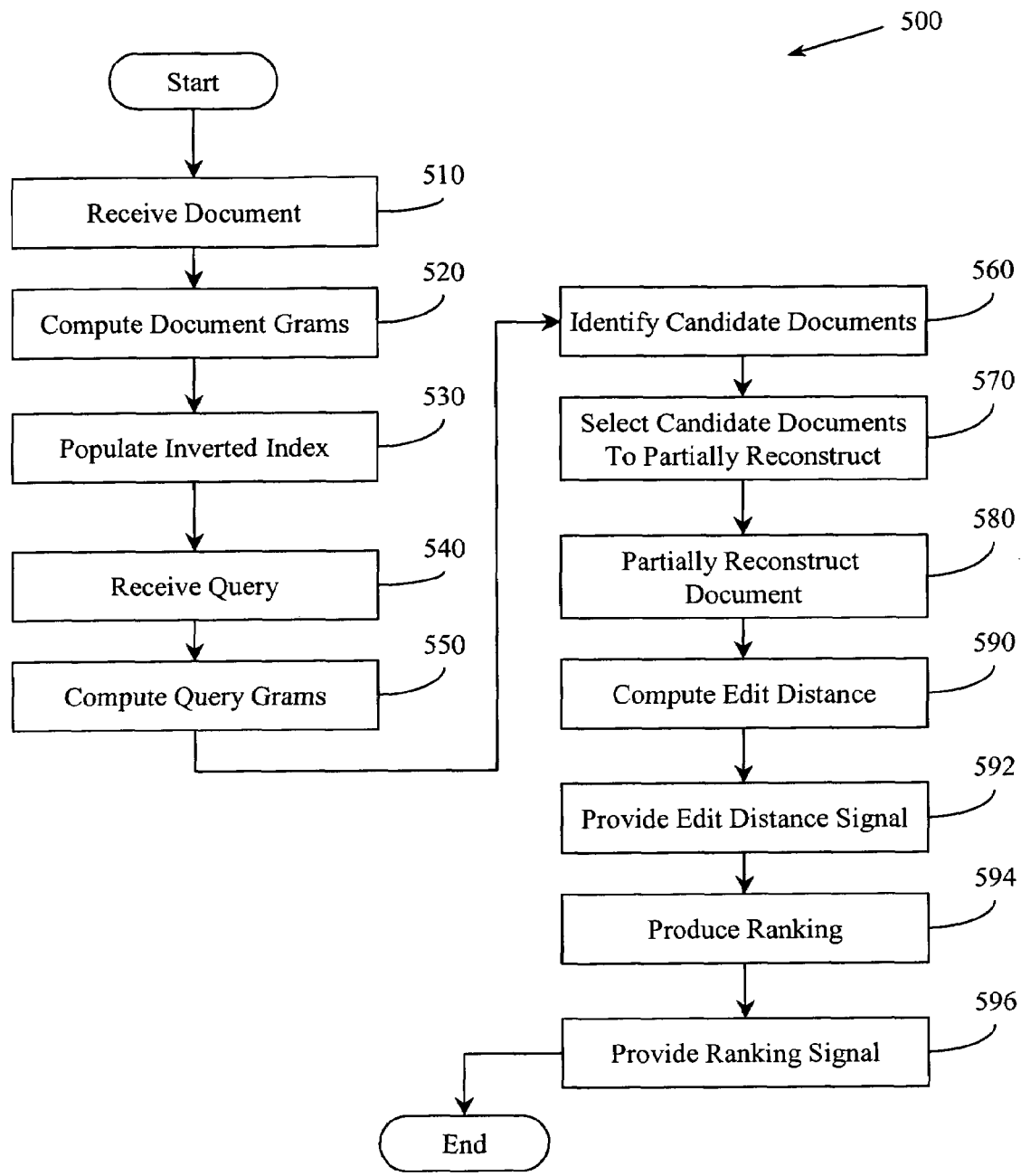
FIG. 5 illustrates an example method for efficient computation of document similarity.

FIG. 5 illustrates a method 500. Method 500 includes some actions similar to those described in connection with method 400 (FIG. 4). For example, method 500 includes receiving documents 510, computing document grams 520, populating an inverted index 530, identifying candidate documents 560, selecting candidate documents 570, partially reconstructing candidate documents 580, computing an edit distance 590, and providing an edit distance signal 592. However, method 500 may include additional actions.

For example, method 500 may include, at 540, receiving a query, and, at 550, computing the first set of grams from the query. Method 500 may compute the grams at 550 using the same techniques, methods, and/or logics as those used at 520. Thus, a direct comparison between query grams associated with the query received at 540 and document grams produced at 520 and stored in the inverted index at 530 may be undertaken.

Method 500 may proceed to select documents to reconstruct, to reconstruct those documents, to produce edit distance scores, and to provide signals concerning the edit distance scores. However, method 500 may take the additional action, at 594, of producing a ranking of the subset of candidate documents, where the ranking is based on a document relevance to the query. Having produced the ranking, method 500 may then proceed, at 596, to provide a signal corresponding to the ranking. The signal may be, for example, a list of hyperlinks to documents.

Figure 6:
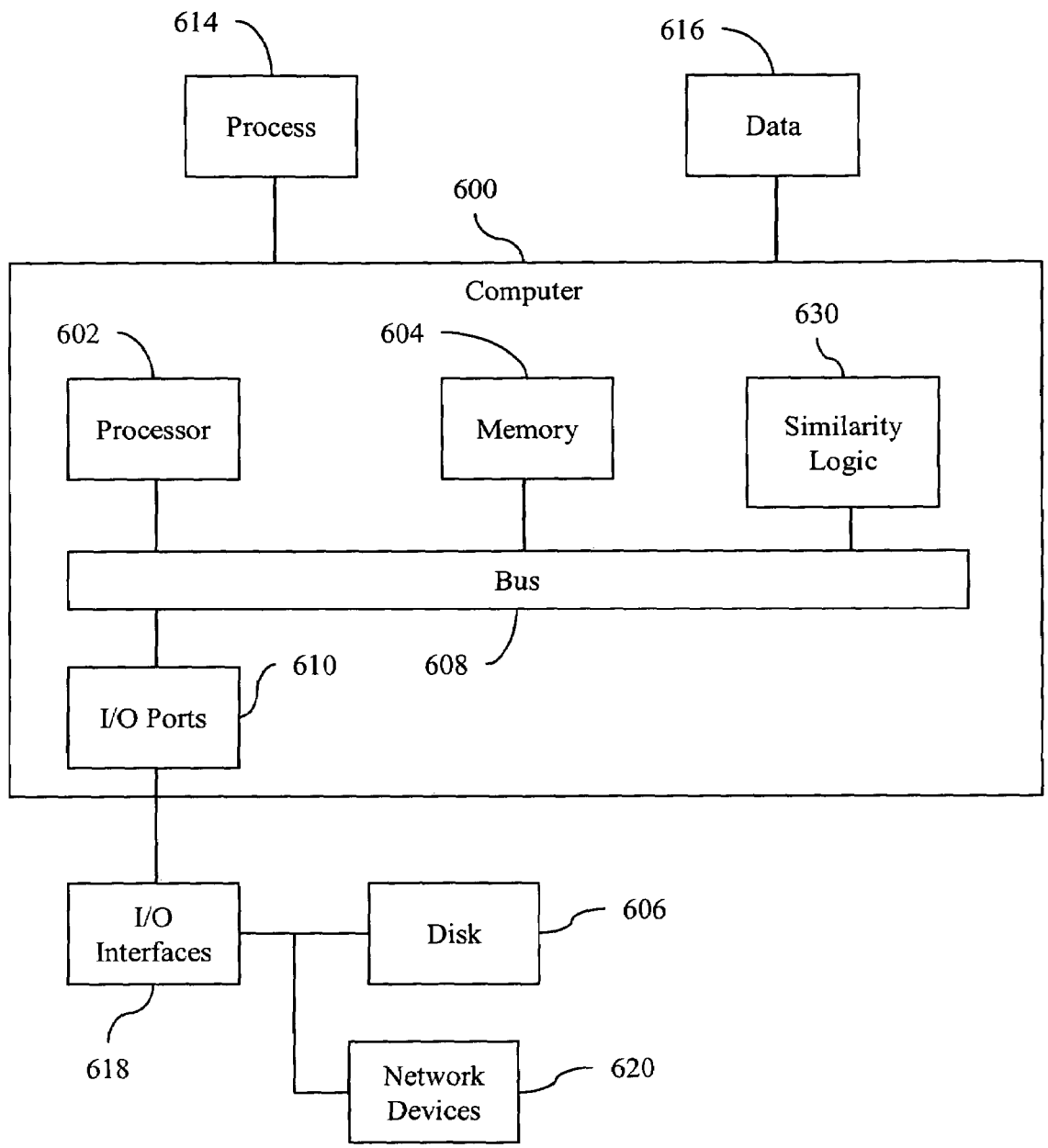
FIG. 6 illustrates an example computing environment in which example systems and methods illustrated herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, the computer 600 may include a similarity logic 630 configured to facilitate efficiently computing document similarity. Logic 630 may provide means (e.g., hardware, memory, data structures) to store document grams associated with indexed documents. Logic 630 may also provide means (e.g., hardware, software, firmware, combinations thereof) for computing query grams associated with a query seeking relevant members of the indexed documents. Logic 630 may also provide means (e.g., hardware, software, firmware, combinations thereof) for computing document relevance. The document relevance may be based on computing an edit distance between a string associated with the query grams and a string associated with a document partially reconstructed from selected document grams. The selected document grams will match at least one of the query grams.

Generally describing an example configuration of the computer 600, the processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports. 100681 The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 620 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a processor;
    a gram logic configured to cause the processor to produce a gram from a string;
    a candidate logic configured to cause the processor to identify one or more candidate documents based on identifying at least one match between a query gram produced by the gram logic from a query string and a document gram associated with a document, where document grams are stored in an inverted index that relates grams to documents, where an entry in the inverted index includes a document identifier and one or more of, a gram offset, a term offset, and a gram type;
    a reconstruction logic configured to cause the processor to produce a partially reconstructed candidate document from one or more entries in the inverted index, the entries being associated with the candidate document, the entries corresponding to one or more query grams that match one or more document grams;
    an edit distance logic configured to cause the processor to compute an edit distance between a first string associated with the query string and a second string associated with the partially reconstructed candidate document, where the edit distance logic is embodied as executable instructions stored on a computer-readable medium;
    a signal logic configured to cause the processor to provide data corresponding to the edit distance; and
    where the reconstruction logic causes the processor to produce the second string, the second string having one or more of, a known substring, and an unknown substring, the location and content of the known substring being determined by information stored in one or more entries in the inverted index, the information comprising offset information, the one or more entries corresponding to matches between document grams associated with the candidate document and query grams associated with the query string.

2. The system of claim 1, comprising a query logic to receive and store the query string.

3. The system of claim 1, where a gram includes one or more of, a skipping character, a mismatch character, and a delimiter character.

4. The system of claim 3, comprising a duplicate removal logic to select one of a plurality of redundant matching grams to include in a string to provide to the edit distance logic.

5. The system of claim 1, the edit distance being one of, a Levenshtein distance, a Hamming distance, a proximity score, and a normalized edit distance score.

6. The system of claim 1, comprising a rank logic to provide an output that describes an ordered set of documents relevant to the query string, the order being based, at least in part, on the data provided by the signal logic.

7. A system comprising:
    a processor;
    a gram logic configured to cause the processor to produce a gram from a string;
    a candidate logic configured to cause the processor to identify one or more candidate documents based on identifying at least one match between a query gram produced by the gram logic from a query string and a document gram associated with a document, where document grams are stored in an inverted index that relates grams to documents;

a reconstruction logic configured to cause the processor to produce a partially reconstructed candidate document from one or more entries in the inverted index, the entries being associated with the candidate document, the entries corresponding to one or more query grams that match one or more document grams;

an edit distance logic configured to cause the processor to compute an edit distance between a first string associated with the query string and a second string associated with the partially reconstructed candidate document, where the edit distance logic is embodied as executable instructions stored on a computer-readable medium;

a signal logic configured to cause the processor provide data corresponding to the edit distance; and where the reconstruction logic causes the processor to select a candidate document to partially reconstruct based on one or more of, the number of matches between query grams associated with the query string and document grams associated with the candidate document, a percentage of matches between query grams and document grams, a normalized similarity score that relates a number of matches between query grams and document grams to one or more of, a total number of query grams, and a total number of document grams.

8. A system, comprising:

a processor a gram logic configured to cause the processor to produce a gram from a string;

a candidate logic configured to cause the processor to identify one or more candidate documents based on identifying at least one match between a query gram produced by the gram logic from a query string and a document gram associated with a document, where document grams are stored in an inverted index that relates grams to documents;

a reconstruction logic configured to cause the processor to produce a partially reconstructed candidate document from one or more entries in the inverted index, the entries being associated with the candidate document, the entries corresponding to one or more query grams that match one or more document grams;

an edit distance logic configured to cause the processor to compute an edit distance between a first string associated with the query string and a second string associated with the partially reconstructed candidate document, where the edit distance logic is embodied as executable instructions stored on a computer-readable medium; and a signal logic configured to provide data corresponding to the edit distance;

a query logic configured to cause the processor to receive and store the query string;

a duplicate removal logic configured to cause the processor to select one of a plurality of redundant matching grams to include in a string to provide to the edit distance logic; and a rank logic configured to cause the processor to provide an output that describes an ordered set of documents relevant to the query string, the order being based, at least in part, the data provided by the signal logic;

where a gram includes one or more of, a skipping character, a mismatch character, and a delimiter character, where the edit distance is one of, a Levenshtein distance, a Hamming distance, a proximity score, and a normalized edit distance score, and where an entry in the inverted index includes a document identifier and one or more of, a gram offset, a term offset, and a gram type;

where the reconstruction logic causes the processor to produce the second string, the second string having one or more of, a known substring, and an unknown substring, the location and content of the known substring being determined by information stored in one or more entries in the inverted index, the information comprising offset information, the one or more entries corresponding to matches between document grams associated with the candidate document and query grams associated with the query string, and where the reconstruction logic causes the processor to select a candidate document to partially reconstruct based on one or more of, the number of matches between query grams associated with the query string and document grams associated with the candidate document, a percentage of matches between query grams and document grams, a normalized similarity score that relates a number of matches between query grams and document grams to one or more of, a total number of query grams, and a total number of document grams.

9. A computer-readable medium having stored thereon instructions that when executed by a processor cause the processor to perform a method, the method comprising:

identifying a set of candidate documents from a set of indexed documents by comparing a first set of grams to a second set of grams, the first set of grams being related to a query for documents, the second set of grams being related to indexed documents;

selecting a subset of the set of candidate documents to partially reconstruct based on a similarity score;

selectively producing a partially reconstructed document from the subset of candidate documents;

selectively computing an edit distance between a first string related to the first set of grams and a second string related to the partially reconstructed document; and providing data corresponding to the edit distance.

10. The computer-readable medium of claim 9, where a gram may include one or more of, a skipping character, a substitution character, and a delimiter character; and where identifying a set of candidate documents includes:

selecting one of a plurality of overlapping matching grams for grams appearing in both the first set of grams and the second set of grams;

finding one or more matches for the selected query gram in an inverted index; and retrieving a document identifier from the inverted index based on the one or more matches for the selected query gram.

11. The computer-readable medium of claim 9, where the similarity score is computed from one or more of, a number of matches between the first set of grams and the second set of grams, a percentage of matches between the first set of grams and the second set of grams, and a normalized score based on a number of matches between the first set of grams and the second set of grams.

12. The computer-readable medium of claim 9, where selecting the subset of the set of candidate documents includes searching an inverted index organized with a gram-based key field, where the inverted index relates grams to documents from which grams were computed, and where the searching is performed on the gram-based key field using a query gram from the first set of grams.

13. The computer-readable medium of claim 9, where an entry in the inverted index includes a document identifier and one or more of, a gram offset, a term offset, and a gram type; and where computing the edit distance includes manipulating one or more of, the first string, and the second string, the manipulating comprising one or more of, aligning the first string and the second string, padding a string, eliminating a character from a string, and replacing a character in a string, the manipulating being based on one or more of, a gram offset, a term offset, and a gram type.

14. The computer-readable medium of claim 9, the method comprising:

receiving a document to be indexed;
computing a set of grams for the document; and
populating an inverted index with a document identifier and data corresponding to the members of the set of grams.

15. The computer-readable medium of claim 9, the method comprising:

receiving a query; and
computing the first set of grams from the query.

16. The computer-readable medium of claim 9, the method comprising:

producing a ranking of the subset of candidate documents, where the ranking is based on a document relevance to the query; and
providing data corresponding to the ranking.

17. The computer-readable medium of claim 9, the method comprising:

receiving a document to be indexed;
computing a set of grams for the document;
populating an inverted index with a document identifier and data corresponding to the members of the set of grams;
receiving a query;
computing the first set of grams from the query;
selecting one of a plurality of overlapping matching grams for grams appearing in both the first set of grams and the second set of grams;
manipulating one or more of, the first string, and the second string, the manipulating comprising one or more of, aligning the first string and the second string, padding a string, eliminating a character from a string, and replacing a character in a string;
producing a ranking of the subset of candidate documents, the ranking being based on a document relevance to the query; and
providing data corresponding to the ranking; and
where selecting the candidate documents includes searching an inverted index organized with a gram-based key field, where the searching is performed on the gram-based key field using a query gram from the first set of grams, where the inverted index relates grams to documents from which the grams were computed, where the similarity score is computed from one or more of, a number of matches between the first set of grams and the second set of grams, a percentage of matches between the first set of grams and the second set of grams, and a normalized score based on a number of matches between the first set of grams and the second set of grams, and where a gram may include one or more of, a skipping character, a substitution character, and a delimiter character.

* * * * *

UNITED STATES PATENT AND TRADEMARK OFFICE
CERTIFICATE OF CORRECTION

PATENT NO. : 7,610,281 B2  Page 1 of 1
APPLICATION NO. : 11/606213
DATED : October 27, 2009
INVENTOR(S) : Rikin Gandhi et al.

It is certified that error appears in the above-identified patent and that said Letters Patent is hereby corrected as shown below:

On sheet 3 of 6, in Figure 3, line 1, beside "Start" insert -- 300 --.

On sheet 6 of 6, in Figure 6, line 1, above "616" insert -- 600 --.

In column 1, line 24, delete "Alpha, ." and insert -- Alpha. --, therefor.

In column 4, line 2, after "appears" insert -- : --.

In column 5, line 3, delete "Implementing" and insert -- implementing --, therefor.

In column 7, line 41, delete "doc," and insert -- $doc_1$ --, therefor.

In column 13, line 18, after "ports." delete "100681".

In column 13, line 18-25, delete "The computer 600......................lines (DSL)." and insert the same on Line 19 as a new paragraph.

In column 15, line 29, in claim 8, after "a processor" insert -- ; --.

Signed and Sealed this

Fourteenth Day of December, 2010

David J. Kappos
*Director of the United States Patent and Trademark Office*